(12) United States Patent
Takasuka et al.

(10) Patent No.: US 7,035,196 B2
(45) Date of Patent: Apr. 25, 2006

(54) OPTICAL HEAD DEVICE AND OPTICAL RECORDING AND REPRODUCING APPARATUS HAVING LASERS ALIGNED IN A TANGENTIAL DIRECTION

(75) Inventors: Shoichi Takasuka, Osaka (JP); Yukio Saitoh, Kyoto (JP); Naoki Nakanishi, Shiga (JP); Hideyuki Nakanishi, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 483 days.

(21) Appl. No.: 09/804,492

(22) Filed: Mar. 12, 2001

(65) Prior Publication Data

US 2002/0021652 A1   Feb. 21, 2002

(30) Foreign Application Priority Data

Mar. 14, 2000   (JP) .............................. 2000-070053

(51) Int. Cl.
*B11B 7/125* (2006.01)
*B11B 7/13* (2006.01)

(52) U.S. Cl. ...................................... 369/121; 369/120

(58) Field of Classification Search .......... 369/112.07, 369/112.12, 112.24
See application file for complete search history.

(56) References Cited

U.S. PATENT DOCUMENTS

| | | | | |
|---|---|---|---|---|
| 4,712,206 A | * | 12/1987 | Kanda | 369/44.25 |
| 5,018,127 A | * | 5/1991 | Ando | 369/112.09 |
| 5,065,380 A | * | 11/1991 | Yokota | 369/44.12 |
| 5,648,951 A | * | 7/1997 | Kato et al. | 369/112.07 |
| 5,734,637 A | * | 3/1998 | Ootaki et al. | 369/112.02 |
| 5,881,035 A | * | 3/1999 | Ueyama | 369/44.23 |
| 5,886,964 A | * | 3/1999 | Fujita | 369/44.37 |
| 5,940,360 A | * | 8/1999 | Choi | 369/112.04 |
| 5,963,515 A | * | 10/1999 | Shindo | 369/44.23 |
| 6,016,300 A | * | 1/2000 | Takeda et al. | 369/112.07 |
| 6,072,579 A | * | 6/2000 | Funato | 356/457 |
| 6,084,843 A | * | 7/2000 | Abe et al. | 369/112.07 |
| 6,118,586 A | * | 9/2000 | Tanabe et al. | 359/566 |
| 6,154,326 A | * | 11/2000 | Ueyanagi et al. | 359/819 |
| 6,166,854 A | * | 12/2000 | Katsuma | 359/569 |
| 6,167,017 A | * | 12/2000 | Higashiura et al. | 369/44.23 |
| 6,487,161 B1 | * | 11/2002 | Maruyama et al. | 369/112.26 |
| 6,489,599 B1 | * | 12/2002 | Takeda | 250/201.5 |
| 6,507,009 B1 | * | 1/2003 | Ohnishi et al. | 250/201.2 |

(Continued)

FOREIGN PATENT DOCUMENTS

EP   0887898 A1   * 12/1998

(Continued)

*Primary Examiner*—Brian E. Miller
*Assistant Examiner*—Michael V. Battaglia
(74) *Attorney, Agent, or Firm*—Hamre, Schumann, Mueller & Larson, P.C.

(57) ABSTRACT

A semiconductor laser element has the following configuration: a dual-wavelength monolithic laser where semiconductor lasers with emission wavelengths of 650 nm and 780 nm are integrated on one chip is soldered on a heat sink which then is soldered on a can package. Two beam emission points of the semiconductor laser element are positioned so that beam spots, formed on an optical disk, of light beams emitted from the two semiconductor lasers are aligned substantially along a pit-row direction in the optical disk. Thus, an optical head device and an optical recording and reproducing apparatus can be obtained that can record information on or reproduce recorded information from optical information recording media with different optical characteristics and recording densities from one another and that do not cause instability in tracking servo operation.

19 Claims, 12 Drawing Sheets

U.S. PATENT DOCUMENTS 6,512,608 B1 * 1/2003 Ohyama ............... 359/15
6,552,990 B1 * 4/2003 Kajiyama et al. ...... 369/112.06
6,646,975 B1 * 11/2003 Uchizaki et al. ............ 369/121

FOREIGN PATENT DOCUMENTS

JP    11-186651    7/1999

* cited by examiner

OPTICAL HEAD DEVICE AND OPTICAL RECORDING AND REPRODUCING APPARATUS HAVING LASERS ALIGNED IN A TANGENTIAL DIRECTION

BACKGROUND OF THE INVENTION

1. Field of the Invention

The present invention relates generally to an optical head device and an optical recording and reproducing apparatus that can record information on or reproduce recorded information from optical information recording media having different optical characteristics and recording densities from one another.

2. Related Background Art

Currently, the optical information recording media that have been in wide use for recording music, image data, or data files include, for example, CD-standardized disks such as a compact disk (hereinafter referred to as "CD"), a CD-read-only memory (CD-ROM), a recordable CD (CD-R) and a rewritable CD (CD-RW), and DVD-standardized disks such as a digital video disk (hereinafter referred to as "DVD"), a DVD-read-only memory (DVD-ROM), a recordable DVD (DVD-R), a rewritable DVD (DVD-RW, DVD+RW) and a DVD-random access memory (DVD-RAM). Light sources to be used for carrying out recording or reproduction with respect to a CD-standardized disk and a DVD-standardized disk having a larger recording capacity than that of the CD-standardized disk are a near-infrared semiconductor laser having an emission wavelength of 780 nm to 820 nm and a red semiconductor laser having an emission wavelength of 630 nm to 690 nm, respectively. Recently, a single apparatus has been requested to allow recording and reproduction to be carried out with respect to both the two types of CD- and DVD-standardized disks. For instance, as shown in FIGS. 20 and 21, an optical head device has been proposed that includes an integrated semiconductor laser device in which two semiconductor laser elements with different emission wavelengths from each other are integrated (see, for example, JP11 (1999)-186651A). The following description outlines the above configuration.

FIG. 20 is a perspective view showing a conventional integrated semiconductor laser device. As shown in FIG. 20, in the integrated semiconductor laser device, an AlGaAs semiconductor laser 131 having an emission wavelength in the 700 nm band (for example, 780 nm) and an AlGaInP semiconductor laser 132 having an emission wavelength in the 600 nm band (for example, 650 nm) are integrated on an n-type GaAs substrate 101 while being separate from each other. In order to satisfy the functional needs of a laser, the AlGaAs semiconductor laser 131 is composed of a plurality of layers formed in accordance with known techniques, such as an n-type GaAs buffer layer 111, an n-type AlGaAs cladding layer 112, an active layer 113, a p-type AlGaAs cladding layer 114, a p-type GaAs cap layer 115, and an n-type GaAs current constriction layer 116. Likewise, the AlGaInP semiconductor laser 132 is composed of a plurality of layers such as an n-type GaAs buffer layer 121, an n-type AlGaInP cladding layer 122, an active later 123, a p-type AlGaInP cladding layer 124, a p-type GaInP intermediate layer 125, a p-type GaAs cap layer 126, and an n-type GaAs current constriction layer 127. Further, in this integrated semiconductor laser device, p-side electrodes are separated so that the AlGaAs semiconductor laser 131 and the AlGaInP semiconductor laser 132 can be driven independently. More specifically, the AlGaAs semiconductor laser 131 can be driven upon passing a current between a p-side electrode 117 and an n-side electrode 129; and the AlGaInP semiconductor laser 132 can be driven upon passing a current between a p-side electrode 128 and the n-side electrode 129. Incidentally, the AlGaAs semiconductor laser 131 and the AlGaInP semiconductor laser 132 are placed on a package base 130 with heat sinks 133 and 134 interposed therebetween, respectively.

FIG. 21 is a layout drawing showing a configuration of an optical disk device for reproducing CDs and DVDs including the integrated semiconductor laser device in FIG. 20. The integrated semiconductor laser device shown in FIG. 20 is used as a semiconductor laser 201 shown in FIG. 21. As shown in FIG. 21, a light beam L emitted from the semiconductor laser 201 is converted to parallel light by a collimator lens 202, and then passes through a beam splitter 203. Subsequently, the light beam L passes through a ¼ wave plate 204 while the degree of its polarization is adjusted thereby. The light beam L whose polarization has been adjusted is focused by an objective lens 205 and is incident on an optical disk 209. Then, signal light L' reflected from the optical disk 209 passes through the objective lens 205 and the ¼ wave plate 204, and then is reflected by the beam splitter 203. Subsequently, the signal light L' goes through a detecting lens 206 and then enters a signal-light detecting photodetector 207. The signal light L' that entered the signal-light detecting photodetector 207 is converted to an electric signal therein and this electric signal is transmitted to a signal-light-reproducing circuit 208. The information written on the optical disk 209 is thus reproduced.

However, when using the conventional integrated semiconductor laser device described above, the optical axes of the AlGaAs semiconductor laser 131 and the AlGaInP semiconductor laser 132 actually are separated by a spacing between their beam emission points. Because of this, as shown in FIG. 22, positions of spots 301 and 302 of laser beams emitted from the AlGaAs semiconductor laser 131 and the AlGaInP semiconductor laser 132, respectively, are separated from each other by a distance of (a spacing between beam emission points)/(optical magnification). Thus, for instance, when the optical axis of a light beam emitted from the AlGaAs semiconductor laser 131 is adjusted to coincide with a center axis of the objective lens 205, the optical axis of a light beam emitted from the AlGaInP semiconductor laser 132 is offset with respect to the center axis of the objective lens 205. As a result, there arises a problem that as the objective lens 205 shifts in a radial direction in the optical disk 209, the variation in a tracking-error signal amount is not balanced, as shown with a characteristic curve G in FIG. 23. Furthermore, when the tracking-error signal amount varies as shown in FIG. 23, particularly, the signal amount is degraded sharply with respect to a shift towards a negative direction. Accordingly, the tracking servo operation is destabilized. Incidentally, numeral 303 in FIG. 22 indicates information recording pits provided on the optical disk 209.

SUMMARY OF THE INVENTION

The present invention is intended to solve the above-mentioned problems in conventional techniques. It is an object of the present invention to provide an optical head device and an optical recording and reproducing apparatus that include a plurality of semiconductor laser elements with different emission wavelengths from one another and that accordingly can record information on or reproduce recorded information from optical information recording media with different optical characteristics and recording densities from one another and do not cause instability in tracking servo operation.

In order to achieve the above-mentioned object, an optical head device of the present invention includes a plurality of semiconductor lasers and optical elements disposed on an optical path between the semiconductor lasers and an optical information recording medium, wherein the plurality of semiconductor lasers are disposed so that beam spots, formed on the optical information recording medium, of light beams emitted from the plurality of semiconductor lasers are aligned substantially parallel to a pit-row direction or a guide groove direction in the optical information recording medium.

According to this configuration of the optical head device, even when an objective lens shifts to follow a track in a radial direction in the optical information recording medium (an optical disk), a radial-shift characteristic of the optical disk varies symmetrically with respect to the neutral position of the objective lens. As a result, a stable tracking operation can be carried out regardless of which semiconductor laser is used.

In addition, preferably, the above optical head device of the present invention further includes a photodetector where returning light from the optical information recording medium enters. This preferable configuration allows the optical head device to be integrated, so that assembly and adjustment in incorporating the optical head device into an optical disk drive can be simplified. Further, in this case, preferably, an objective lens is provided therein as one of the optical elements and is fixed to a package, and the plurality of semiconductor lasers, the optical elements and the photodetector are disposed in the package. This preferable configuration can suppress degradation of optical characteristics such as reflected light quantity from the optical disk due to the shift of the objective lens as in the case of the conventional optical head device. Further, in this case, it is preferable that a supporter also be provided therein where the package is connected to the supporter and is movable with respect thereto. This preferable configuration allows the whole optical system including the objective lens to be shifted as one unit. Hence, even in the case where the objective lens follows variations of the optical disk, the stable characteristics can be obtained with optical shifts avoided.

Furthermore, in the above optical head device of the present invention, it is preferable that the plurality of semiconductor lasers have different emission wavelengths from one another. In this case, preferably, the optical head device is provided with two semiconductor lasers that have different emission wavelengths, each of which is selected from a group consisting of ranges of: 630 nm to 690 nm, 780 nm to 820 nm, and 200 nm to 450 nm. These preferable configurations allow this optical head device to be applied to recording and reproduction with respect to optical disk media, which currently are available in the market, such as CD, CD-R/RW, DVD, DVD-ROM, DVD-RAM, and DVD-R/RW/+RW. This optical head device further can be applied to recording and reproduction with respect to a next generation HD-DVD-standardized disk using a blue light source. Further, in this case, it is preferable that the optical head device further include a plurality of photodetectors where returning light from the optical information recording medium enters, wherein the plurality of semiconductor lasers and at least part of the plurality of photodetectors are integrated on one substrate. This preferable configuration allows light receiving/emitting elements to be integrated and to be formed as one unit, so that the assembly process of the optical head device can be simplified and at the same time the optical head device can be reduced in size and weight.

Furthermore, in the above optical head device of the present invention, it is preferable that beam emission points of the plurality of semiconductor lasers be aligned on a substantially straight line and are spaced at 150 µm or less. According to this preferable configuration, in manufacturing an optical head device in which a single objective lens is used for recording or reproduction with respect to a plurality of optical information recording media (optical disks), even when an optical-axis center of the objective lens is positioned on an optical axis of one of the semiconductor lasers, an influence of abaxial aberrations generated in light beams emitted from the other semiconductor lasers can be suppressed.

Furthermore, in the above optical head device of the present invention, it is preferable that a diffraction grating be included as one of the optical elements. This preferable configuration allows light beams to be branched without using bulky optical components such as a beam splitter, and thus the optical head device can be reduced in size and weight. Further, in this case, preferably, the diffraction grating is divided into 2n (where n indicates a natural number) diffraction regions with different grating periods from one another. According to this preferable configuration, a diffraction angle can be adjusted by changing the grating period. Hence, when a tracking-error signal is obtained while returning light from the optical information recording medium is divided into 2n, respective diffracted beams can be led to the photodetector without interfering with one another. Further, in this case, it is preferable that dividing lines that divide the diffraction regions be positioned substantially parallel to or substantially perpendicular to the pit-row direction or the guide groove direction in the optical information recording medium. This preferable configuration allows returning light from the optical information recording medium to be received while being divided into two or four equal parts in a direction that is substantially parallel to or substantially perpendicular to the pit-row direction or the guide groove direction. Thus, a push-pull signal and a phase-difference signal can be detected. Further, in this case, preferably, one of the dividing lines that divides the diffraction regions divides returning light from the optical information recording medium into two substantially equal parts. According to this preferable configuration, in detecting a tracking-error signal by a push-pull method, an offset amount of the push-pull signal can be minimized. Further, in this case, it is preferable that the diffraction grating is divided into 2n (where n indicates a natural number) diffraction regions with different grating pitch directions from one another. According to this preferable configuration, in obtaining a tracking-error signal while returning light from the optical information recording medium is divided into 2n, respective diffracted beams can be led to the photodetector without interfering with one another. Further, in this case, it is preferable that the dividing lines that divide the diffraction regions be positioned substantially parallel to or substantially perpendicular to the pit-row direction or the guide groove direction in the optical information recording medium. Furthermore, in this case, preferably, one of the dividing lines divides returning light from the optical information recording medium into two substantially equal parts. Moreover, in this case, it is preferable that the diffraction grating be sawtooth-shaped. This preferable configuration allows only zeroth-order diffracted light and +1st-order diffracted light to be formed and can suppress formation of −1st-order diffracted light, so that light beams effectively can be led in only one direction. Consequently, an area where the photodetector is disposed can be reduced with an S/N ratio secured. Further, in this case, preferably, the diffraction grating has grooves whose depths vary in a step-wise manner in a constant period. According to this preferable configuration, even when it is difficult to form the diffraction grating to have a blaze shape (a saw-toothed shape), by forming the grooves to have as many different depths varying in a step-wise manner as possible, substantially the same effect as that obtained in the case of using the blazed (saw-toothed) diffraction grating can be obtained.

Furthermore, in the above optical head device of the present invention, it is preferable that all of the plurality of semiconductor lasers be disposed on a heat sink made of a metal or a semiconductor material. This preferable configuration allows heat dissipation to be improved, and thus a highly reliable optical head device can be obtained.

Furthermore, in the above optical head device of the present invention, preferably, a plurality of photodetectors also are provided where returning light from the optical information recording medium enters, and the optical elements and the plurality of photodetectors are disposed so that part of the returning light from the optical information recording medium, which originates in each of the light beams emitted from the plurality of semiconductor lasers, enters one of the plurality of photodetectors at a time. According to this preferable configuration, returning light can share the photodetectors with one another, and thus the optical head device can be simplified structurally and thereby can be assembled easily. Further, in this case, it is preferable that each of the plurality of photodetectors includes a light-receiving region divided into two parts in a direction that is substantially parallel to or substantially perpendicular to the pit-row direction or the guide groove direction in the optical information recording medium, part of returning light from the optical information recording medium being detected therein irrespective of which of the plurality of semiconductor lasers emits light beams. This preferable configuration allows a tracking-error signal to be detected by a push-pull method or a phase-difference method with respect to a variety of optical information recording media subjected to a recording or reproducing operation. As a result, since it is no longer necessary to switch tracking-error signal detecting methods depending on the type of optical disk media to be used, the optical configuration of the optical head device and the configuration of the photodetector can be simplified. Further, in this case, preferably, the optical head device includes a linear diffraction grating as one of the optical elements, and returning light from the optical information recording medium that originates in ±1st-order diffracted light formed by the diffraction grating is detected in the light-receiving region. This preferable configuration allows a tracking-error signal to be detected also by a 3-beam method. Thus, in this case, tracking-error signals that are suitable for respective optical disk media subjected to a recording or reproducing operation can be detected, and thereby servo stability can be improved considerably.

Furthermore, in the above optical head device of the present invention, it is preferable that a rim-intensity correction means further be provided. According to this preferable configuration, in disposing the plurality of semiconductor lasers so that beam spots, formed on the optical information recording medium, of light beams emitted from the plurality of semiconductor lasers are aligned substantially parallel to the pit-row direction or the guide groove direction in the optical information recording medium, even when a flare angle of a light beam emitted from the semiconductor laser element becomes narrower in a direction of the pit row or the guide groove, the light beam can be focused sufficiently in the direction of the pit row or the guide groove on the optical information recording medium by correcting rim intensity. Thus, a reproduced signal with an excellent jitter can be obtained.

In addition, the optical recording and reproducing apparatus of the present invention is an optical recording and reproducing apparatus provided with an optical head device including a plurality of semiconductor lasers with different emission wavelengths from one another and optical elements disposed on an optical path between the plurality of semiconductor lasers and an optical information recording medium, wherein the plurality of semiconductor lasers are disposed so that beam spots, formed on the optical information recording medium, of light beams emitted from the plurality of semiconductor lasers are aligned substantially parallel to a pit-row direction or a guide groove direction in the optical information recording medium.

According to the above configuration of the optical recording and reproducing apparatus, it is possible to record information on or to reproduce recorded information from a plurality of optical information recording media with different optical characteristics and recording densities from one another without causing instability in tracking servo operation.

DETAILED DESCRIPTION OF THE INVENTION

Hereinafter, the present invention will be described more specifically by way of illustrative embodiments.

First Embodiment

Figure 1:
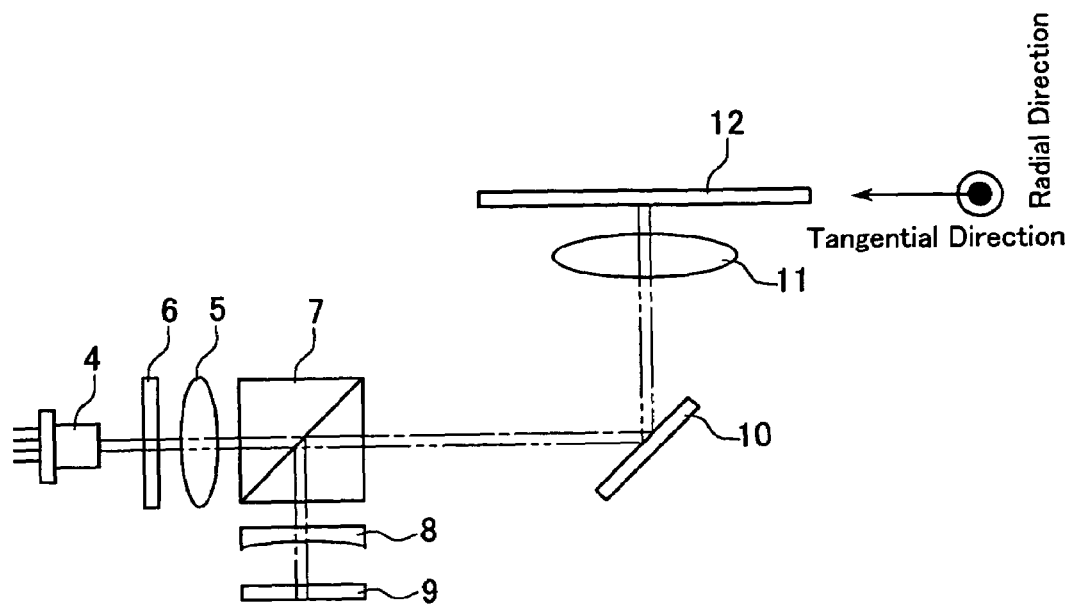
FIG. 1 is a structural view showing an optical head device according to a first embodiment of the present invention.
Figure 2:
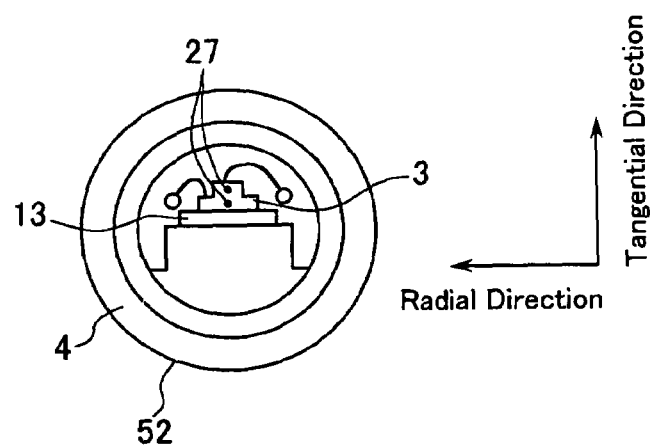
FIG. 2 is a structural view showing a semiconductor laser element according to the first embodiment of the present invention.
Figure 3:
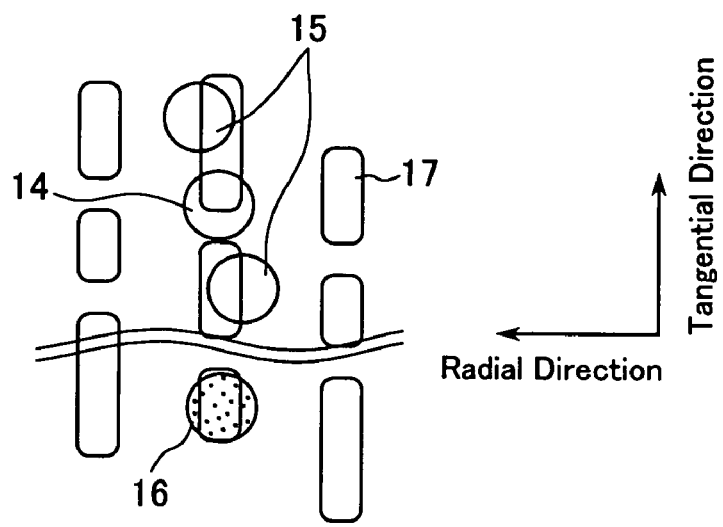
FIG. 3 is a diagram showing a state of beam spots on an optical disk according to the first embodiment of the present invention.
Figure 4:
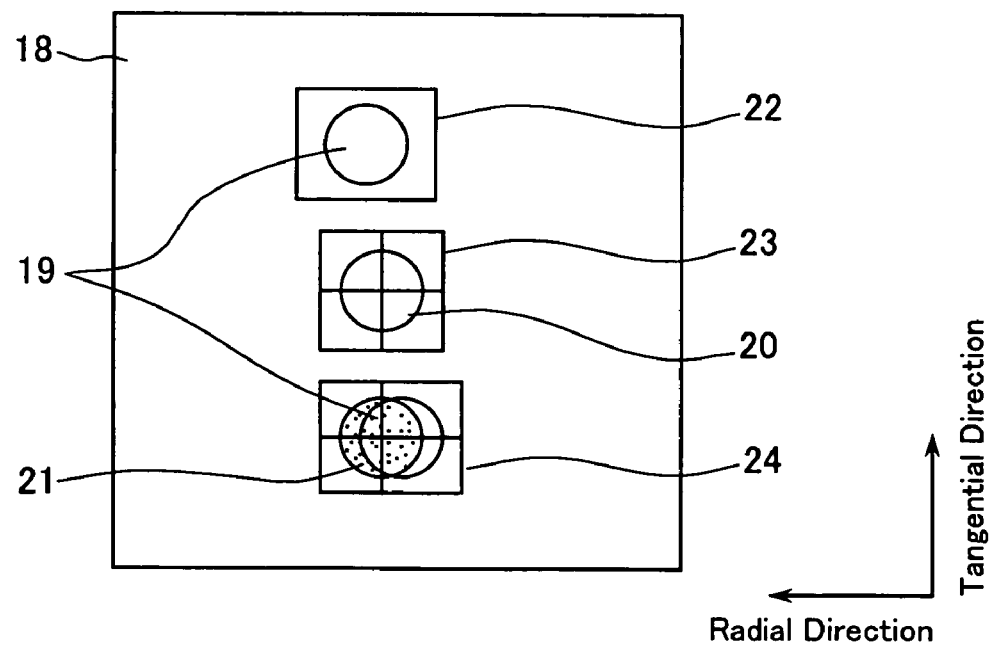
FIG. 4 is a structural view showing a light-receiving substrate according to the first embodiment of the present invention.

First, an optical head device and an optical recording and reproducing apparatus according to a first embodiment of the present invention will be described with reference to FIGS. 1 to 9 in the following. FIG. 1 is a structural view showing the optical head device; FIG. 2 a structural view showing a semiconductor laser element; FIG. 3 a diagram showing a state of beam spots on an optical disk; FIG. 4 a structural view showing a light-receiving substrate; and FIG. 5 a graph showing the dependence of a tracking-error signal amount on a shift of an objective lens in the optical head device, according to the first embodiment of the present invention.

The optical head device according to this embodiment is configured to carry out recording and reproduction with respect to CD-standardized disks (such as CD, CD-ROM, CD-R and CD-RW) and DVD-standardized disks (such as DVD, DVD-ROM, DVD-R, DVD-RW, DVD+RW and DVD-RAM). As shown in FIG. 1, a diffraction grating 6 for 3-beam formation, a collimator lens 5, a beam splitter 7, a mirror 10 for reflecting light upward, and an objective lens 11 are disposed on an optical path between a semiconductor laser element 4 and an optical disk 12, in that order starting from the semiconductor laser element 4 side. Further, a cylindrical lens 8 is disposed on an optical path between the beam splitter 7 and a photodetector 9.

As shown in FIG. 2, the semiconductor laser element 4 has the following configuration: a dual-wavelength monolithic laser 3 where semiconductor lasers with emission wavelengths of 650 nm and 780 nm are integrated on one chip is soldered on a heat sink 13 made of a metal or a semiconductor material, which then is soldered on a can package 52. Two beam emission points 27 of the semiconductor laser element 4 are arranged so that beam spots 14 to 16 on the optical disk 12 of light beams emitted from the two semiconductor lasers substantially are aligned along a pit-row direction (a tangential direction) in the optical disk 12 (see FIG. 3). In FIG. 3, numeral 17 indicates a pit.

It is desirable that the two beam emission points 27 of the semiconductor laser element 4 are spaced at 150 μm or less.

The following description is directed to the operation of the optical head device of the present embodiment.

Once an optical disk is introduced into the optical recording and reproducing apparatus, an optical-disk discriminating means (not shown in the figure) determines whether the optical disk is a CD-standardized or DVD-standardized disk. In the case where the optical disk introduced into the optical recording and reproducing apparatus is a CD-standardized disk, infrared light with a wavelength of 780 nm is emitted from the semiconductor laser element 4. On the other hand, in the case where the optical disk introduced into the optical recording and reproducing apparatus is a DVD-standardized disk, red light having a wavelength of 650 nm is emitted from the semiconductor laser element 4. A light beam emitted from the semiconductor laser element 4 passes through the diffraction grating 6 for 3-beam formation, and subsequently is converted to parallel light by the collimator lens 5. The diffraction grating 6 is a linear rectangular grating having a refractive index of approximately 1.52 and a duty ratio of approximately 0.5 with respect to light with a wavelength of 780 nm. The groove depth in the diffraction grating 6 is set to be approximately 1.25 μm so that a zeroth-order diffraction efficiency (transmittance) with respect to light with wavelengths of 650 nm and 780 nm may be approximately 100% and 74.5%, respectively, and a 1st-order diffraction efficiency (transmittance) with respect to light with a wavelength of 780 nm may be approximately 10%. That is to say, red light entering the diffraction grating 6 simply passes therethrough, whereas in the case of infrared light entering it, a main beam and two sub-beams are formed using ±1st-order diffracted light. The parallel light, after passing through the collimator lens 5, passes through the beam splitter 7 and subsequently, its optical path is changed by the mirror 10 for reflecting light upward. The parallel light whose optical path has been changed is focused on the optical disk 12 by the objective lens 11. As shown in FIG. 3, when the optical disk 12 is a CD-standardized disk, a main beam spot 14 and sub-beam spots 15 are formed on the optical disk 12. On the other hand, when the optical disk 12 is a DVD-standardized disk, only a main beam spot 16 is formed on the optical disk 12.

The returning light from the optical disk 12 passes through the objective lens 11 and after its optical path is changed by the mirror 10, enters the beam splitter 7. The returning light that entered the beam splitter 7 is reflected by a reflecting surface of the beam splitter 7 and then is led to the photodetector 9 in a state where it is subjected to a unidirectional focusing action by the cylindrical lens 8.

As shown in FIG. 4, light-receiving regions 22 to 24 are formed on a light-receiving substrate 18 of the photodetector. The light-receiving region 23 is divided into two parts in a direction substantially parallel to a pit-row direction in the optical disk 12 (a tangential direction in the optical disk 12), and also is divided into two parts in a direction substantially perpendicular to the pit-row direction in the optical disk 12. That is, the light-receiving region 23 is divided into four parts. The light-receiving region 24 is divided into four parts so that a main beam 21 of red light is divided into two portions in each of directions parallel to and perpendicular to the pit-row direction.

When the optical disk 12 is a CD-standardized disk, a main beam 20 is received by the four-divided light-receiving region 23 and a focus error signal is detected with a reproduced signal by an astigmatism method. Sub-beams 19 are received by the light-receiving regions 22 and 24 and a tracking-error signal is detected by a 3-beam method. On the other hand, when the optical disk 12 is a DVD-standardized disk, a main beam 21 is received by the four-divided light-receiving region 24 and a tracking-error signal is detected with a reproduced signal by a phase difference method or a push-pull method, and a focus error signal is detected by the astigmatism method.

Figure 5:
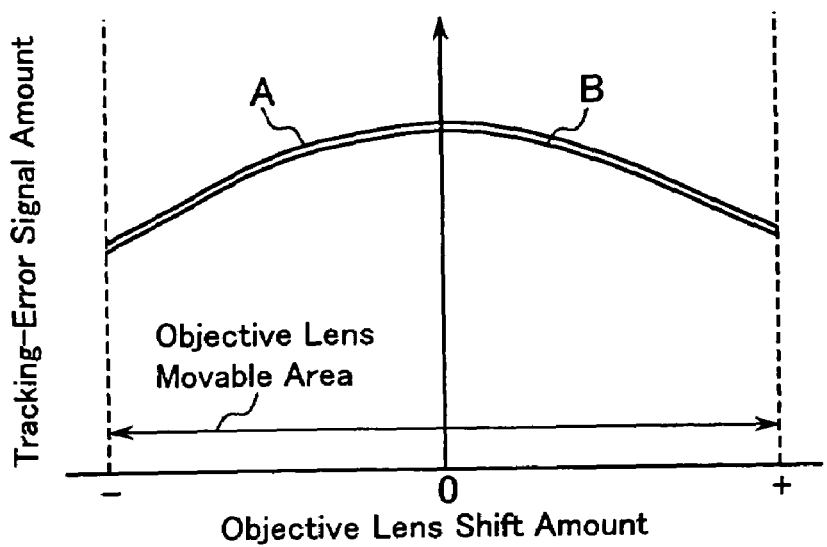
FIG. 5 is a graph showing the dependence of a tracking-error signal amount on a shift of an objective lens in the optical head device according to the first embodiment of the present invention.

As described above, when the two beam emission points 27 of the semiconductor laser element 4 are positioned so that the beam spots, formed on the optical disk 12, of light beams emitted from the two semiconductor lasers are aligned substantially along the pit-row direction in the optical disk 12 (the tangential direction in the optical disk 12), even when the objective lens 11 shifts to follow a track in a radial direction in the optical disk 12, as graphically shown in FIG. 5, both curves A and B indicating a radial-shift characteristics of the DVD-standardized disk and the CD-standardized disk, respectively, vary symmetrically with respect to the neutral position of the objective lens 11. As a result, a stable tracking operation can be carried out.

Figure 8:
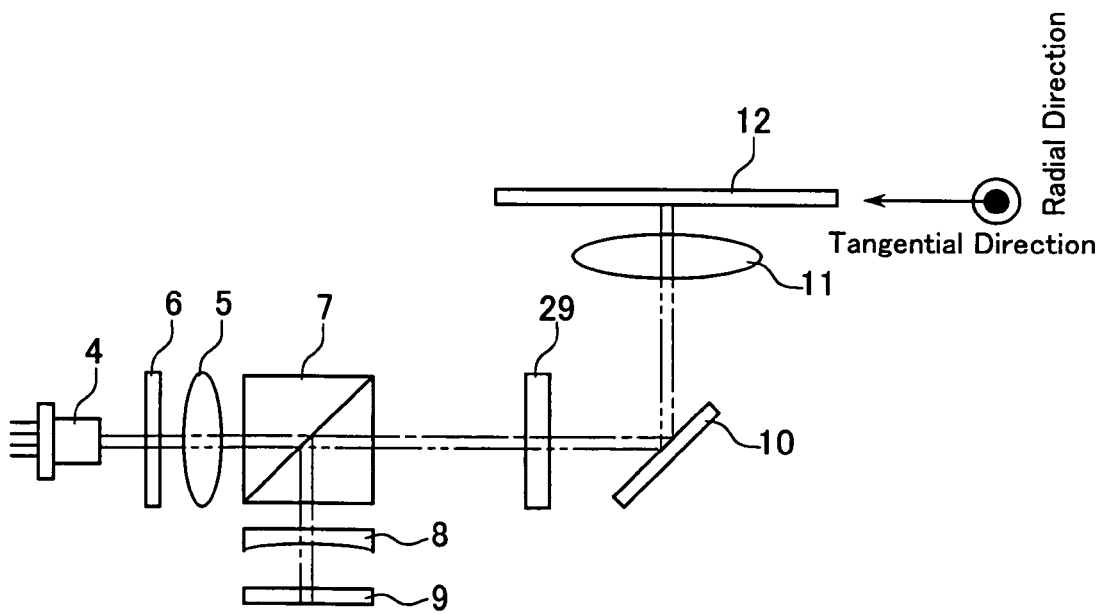
FIG. 8 is a structural view showing another optical head device according to the first embodiment of the present invention.
Figure 9:
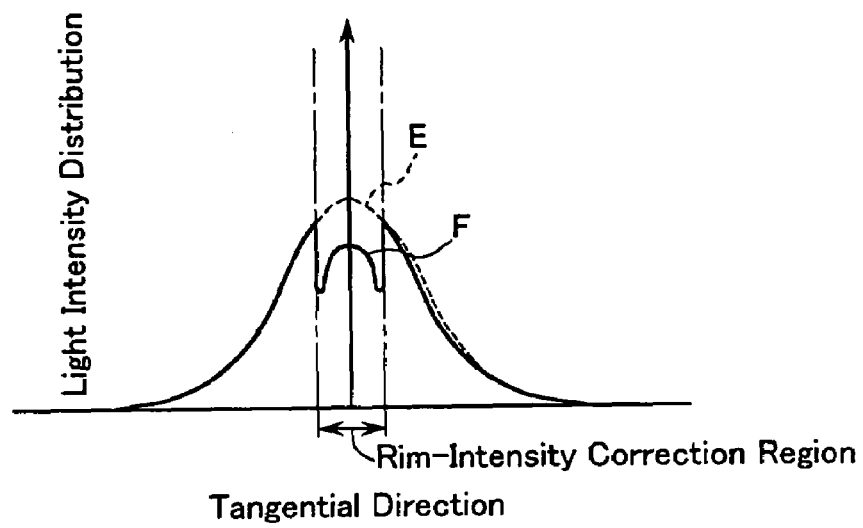
FIG. 9 is a graph for explaining a function of the effectiveness of a rim-intensity correction element in another optical head device according to the first embodiment of the present invention.

Furthermore, when the semiconductor laser element 4 has the configuration described above, there is a possibility that a flare angle of an emitted light beam may be narrower in the tangential direction than in the radial direction and thus a beam spot may not be focused sufficiently (to a degree required to obtain a reproduced signal) in the pit-row direction on the optical disk 12. In this case, a rim-intensity correction element 29 can be provided additionally as shown in FIG. 8. The rim-intensity correction element 29 has a transmittance distribution allowing the intensity of a center portion of an emitted light beam to decrease, and thus changes a light intensity distribution E before the light beam goes therethrough into a light intensity distribution F with only the intensity of the center portion of the light beam decreased after the light beam goes therethrough (see FIG. 9). Hence, the rim intensity in the tangential direction is increased relatively and this makes it possible to obtain a beam spot focused sufficiently in the pit-row direction.

Figure 6:
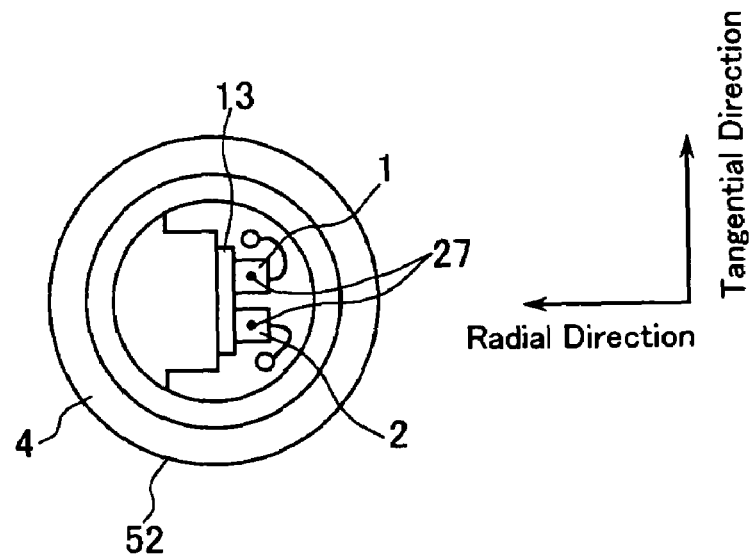
FIG. 6 is a structural view showing another semiconductor laser element according to the first embodiment of the present invention.

In this embodiment, the dual-wavelength monolithic laser 3 is used as the semiconductor laser element 4, but the optical head device is not always required to have this configuration. As shown in FIG. 6, separate semiconductor laser 1 with a wavelength of 650 nm and semiconductor laser 2 with a wavelength of 780 nm may be used in place of the dual-wavelength monolithic laser 3.

Figure 7:
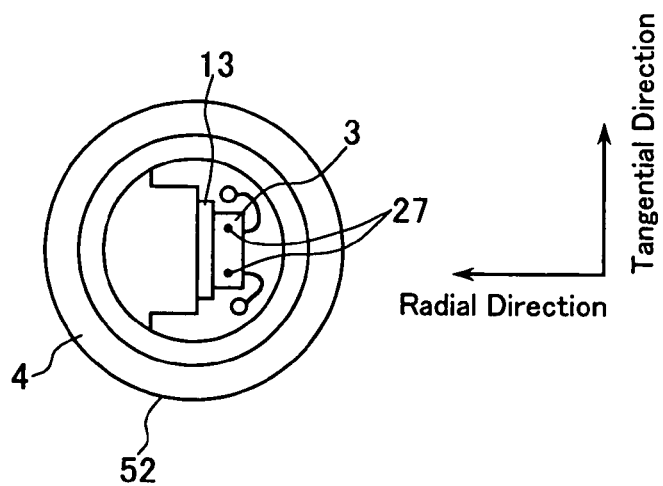
FIG. 7 is a structural view showing yet another semiconductor laser element according to the first embodiment of the present invention.

When the dual-wavelength monolithic laser 3 is used, it may be configured so that the beam emission points 27 are aligned with respect to the can package 52 as shown in FIG. 7.

Furthermore, this embodiment was described using an example employing two semiconductor lasers. However, the present invention is not necessarily limited to this configuration. For instance, three semiconductor lasers or more may be used.

Furthermore, the description of this embodiment was directed only to recording or reproduction with respect to a CD-standardized disk and a DVD-standardized disk. However, when using a semiconductor laser with a wavelength around 400 nm, the optical head device also can be applied to a HD-DVD and the same effect as described above can be obtained.

In this embodiment, the semiconductor lasers with emission wavelengths of 650 nm and 780 nm were used, but the emission wavelength of each semiconductor laser can be selected from a group consisting of ranges of: 630 nm to 690 nm, 780 nm to 820 nm, and 200 nm to 450 nm.

Figure 10:
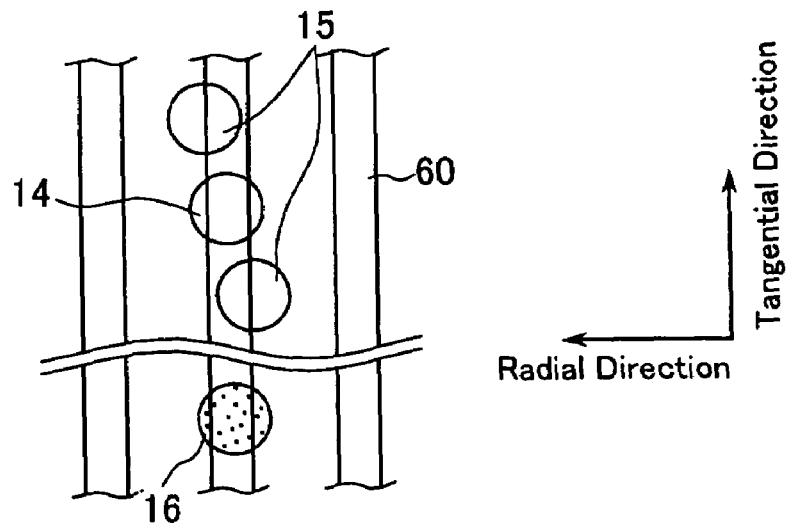
FIG. 10 is a diagram showing a state of beam spots on another optical disk according to the first embodiment of the present invention.

Moreover, in this embodiment, the two beam emission points 27 of the semiconductor laser element 4 are positioned so that the beam spots 14 to 16, formed on the optical disk 12, of light beams emitted from the two semiconductor lasers are aligned substantially along the pit-row direction in the optical disk 12. However, the present invention is not always limited to this configuration. A recordable optical disk such as a CD-R has a spiral guide groove formed therein as a guide to the recording part. Hence, the two beam emission points 27 of the semiconductor laser element 4 may be positioned so that the beam spots 14 to 16, formed on the optical disk 12, of the light beams emitted from the two semiconductor lasers are aligned substantially along a direction of a guide groove 60 of the optical disk 12 as shown in FIG. 10.

Second Embodiment

Figure 11:
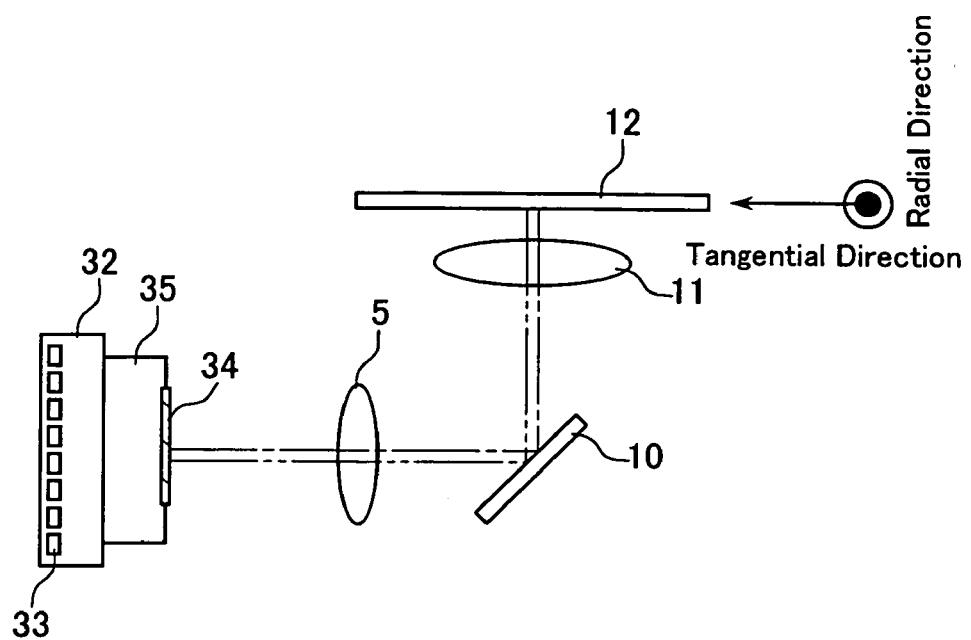
FIG. 11 is a structural view showing an optical head device according to a second embodiment of the present invention.
Figure 12:
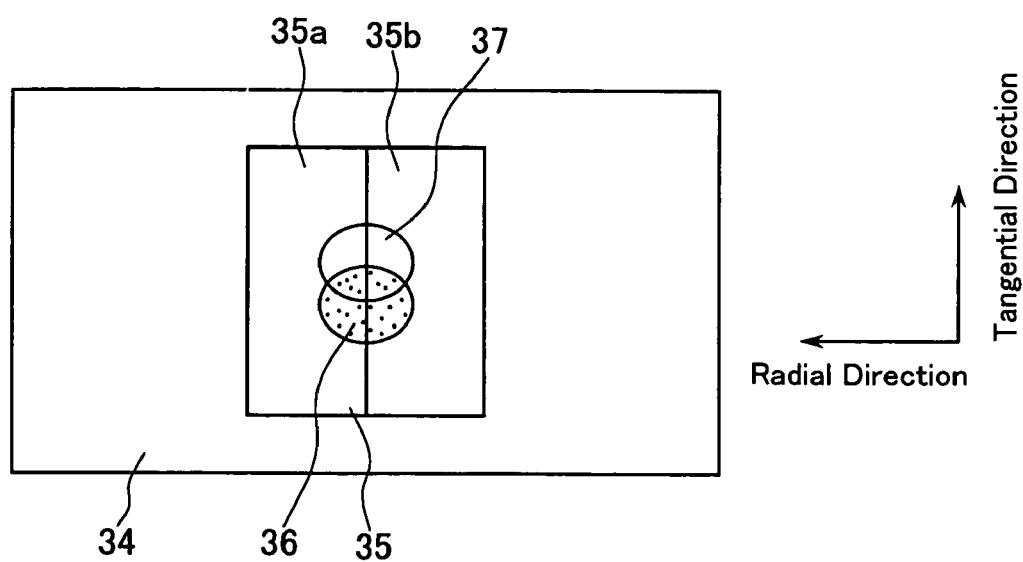
FIG. 12 is a plan view showing a holographic optical element according to the second embodiment of the present invention.
Figure 13:
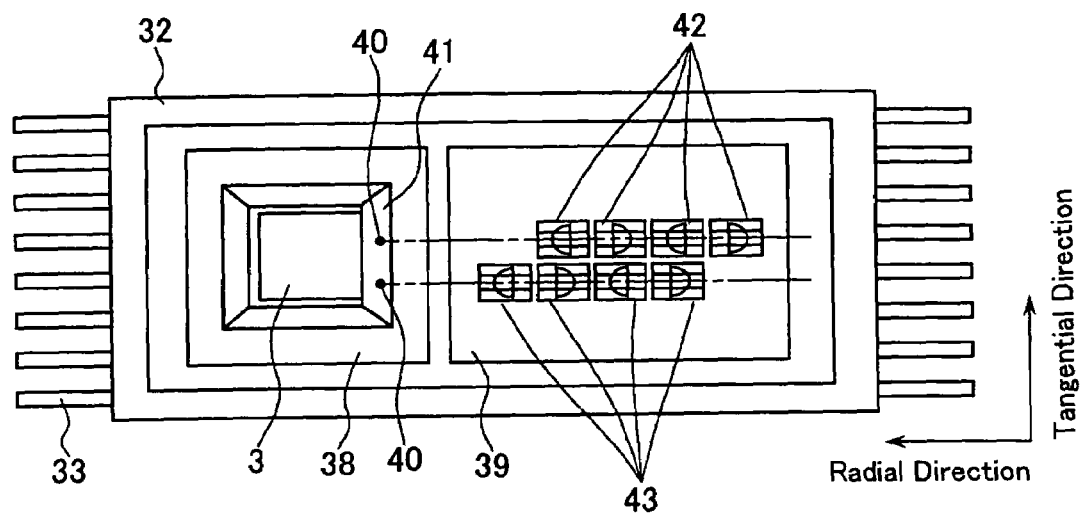
FIG. 13 is a plan view showing an optical module according to the second embodiment of the present invention.

An optical head device and an optical recording and reproducing apparatus according to a second embodiment of the present invention will be described with reference to FIGS. 11 to 13 in the following. FIG. 11 is a structural view showing an optical head device; FIG. 12 a plan view showing a holographic optical element; and FIG. 13 a plan view showing an optical module, according to the second embodiment of the present invention.

The optical head device of this embodiment has basically the same configuration as that of the first embodiment. However, as shown in FIG. 11, optical components other than a collimator lens 5, a mirror 10 for reflecting light upward, and an optical lens 11 are integrated as an optical module 32.

The following description is directed to the operation of the optical module 32. As shown in FIG. 13, the optical module 32 includes a dual-wavelength monolithic laser 3, a substrate 38 containing a 45° micro mirror with the dual-wavelength monolithic laser 3 mounted thereon, and a light-receiving substrate 39 with light-receiving regions 42 and 43 formed thereon. In FIG. 13, numeral 41 indicates the 45° micro mirror. Further, as shown in FIGS. 11 and 12, a holographic optical element 34 with a holographic region 35 formed as a diffraction grating on its upper face is disposed on top of the optical module 32.

The holographic region 35 is divided into two diffraction regions 35a and 35b with different grating periods from each other. A dividing line dividing the holographic region 35 is provided substantially in parallel to a pit-row direction in an optical disk 12 (a tangential direction in the optical disk 12). In this case, the holographic region 35 is divided into two diffraction regions 35a and 35b with different grating periods from each other. However, if the holographic region 35 is divided into 2n (where n indicates a natural number) diffraction regions with different grating periods from one another, a diffraction angle can be adjusted by changing the grating period. Therefore, when a tracking-error signal is obtained with returning light from the optical disk 12 divided into 2n, each of the diffracted beams can be led to a photodetector without interfering with one another. Further, in this case, the dividing line is provided substantially parallel to the pit-row direction in the optical disk 12 (the tangential direction in the optical disk 12). However, when the dividing line is provided substantially parallel to or substantially perpendicular to the direction of the pit row or a guide groove on the optical disk 12, the returning light from the optical disk 12 can be received while being divided into two or four equal parts in a direction substantially parallel to or substantially perpendicular to the pit-row direction or the guide groove direction. Thus, a push-pull signal and a phase-difference signal can be detected.

Furthermore, in this case, the holographic region 35 is divided into two diffraction regions 35a and 35b with different diffraction periods from one another, but may be divided into 2n (where n indicates a natural number) diffraction regions with different grating pitch directions from one another. Likewise, when a tracking-error signal is obtained with returning light from the optical disk 12 divided into 2n, each of the diffracted beams can be led to the photodetector without interfering with one another.

A light beam emitted from the dual-wavelength monolithic laser 3 is reflected by the 45° micro mirror 41, then goes out from the optical module 32, and is converted to parallel light by the collimator lens 5. Subsequently, the optical path of the parallel light is changed by the mirror 10 for reflecting light upward, and then the parallel light is focused on the optical disk 12 by the objective lens 11.

Figure 14:
FIG. 14 is a diagram schematically showing an example of a shape of a diffraction grating in a holographic region according to the second embodiment of the present invention.

The returning light from the optical disk 12 passes through the objective lens 11 and after its optical path is changed by the mirror 10, passes through the collimator lens 5. Then, the light that passed through the collimator lens 5 is led to a region in the holographic region 35 that is determined depending on the standard of the optical disk 12 subjected to recording or reproduction as shown in FIG. 12. The holographic region 35 is formed of a curved sawtoothed (blazed) diffraction grating as shown in FIG. 14. The holographic region 35 roughly operates to divide returning light 37 or 36 into two along the tangential direction and then to diffract and focus the returning light thus divided on light-receiving regions 42 and 43. More specifically, each of the two regions of the holographic region 35 further is divided into strip-shaped regions with different grating periods from one another for forming +1st-order diffracted light and −1st-order diffracted light. Thus, while dividing the returning light 36 or 37 into two, the holographic region 35 discriminates between the +1st-order diffracted light and the −1st-order diffracted light to lead them to the light-receiving regions 43 and 42, respectively. Each of the light-receiving regions 42 and 43 is composed of a set of four light-receiving regions each divided into three parts. The light-receiving regions 42 and 43 receive the ±1st-order diffracted light from the holographic region 35 and detect focus error signals and tracking-error signals by an SSD (spot size detection) method and a push-pull method, respectively.

Furthermore, a reproduced signal can be detected by adding the quantities of all the light beams that entered the light-receiving regions 42 and 43. The signal thus detected can be output via an output terminal 33.

The above-mentioned configuration allows apparent beam emission points 40 on the 45° micro mirror 41 of the dual-wavelength monolithic laser 3 to be aligned in the tangential direction. Accordingly, as described above in the first embodiment, a stable tracking servo operation can be secured regardless of the standard of the optical disk 12 subjected to recording or reproduction. Further, since most of the optical components required for assembling the optical head device are integrated, the device can be reduced in size and weight and at the same time, the process for assembling and adjusting the device can be simplified.

Figure 15:
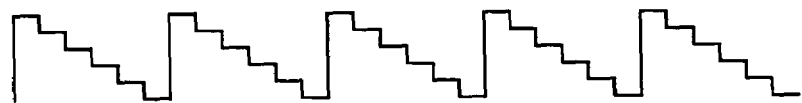
FIG. 15 is a diagram schematically showing another example of a shape of the diffraction grating in the holographic region according to the second embodiment of the present invention.

Incidentally, in this embodiment, the saw-toothed diffraction grating shown in FIG. 14 was described as an example of the diffraction grating of the holographic region 35. However, when it is difficult to produce such a saw-toothed shape, a diffraction grating may be used that includes grooves whose depths vary in a step-wise manner in a constant period as shown in FIG. 15. In this case, when the grooves are formed to have as many different depths varying in a step-wise manner in each period as possible, substantially the same effect as that obtained in the case of using the saw-toothed diffraction grating can be obtained.

Moreover, the above-mentioned configuration also provides an advantage other than the increased stability of the tracking servo operation. That is, generally, when a phase-difference method or the push-pull method has to be used as a tracking method (recording with respect to a CD-R and recording or reproduction with respect to a DVD-RAM, a DVD-RW or a DVD+RW require detections of push-pull signals.), returning light from the optical disk 12 is required to be divided into at least two along the tangential direction to be received. When the beam emission points 40 are aligned in the tangential direction as described above, all of a plurality of returning light beams can be divided substantially into two equal parts by a single dividing line on the holographic region 35. Thus, the holographic region 35 can be structurally simplified.

Figure 16:
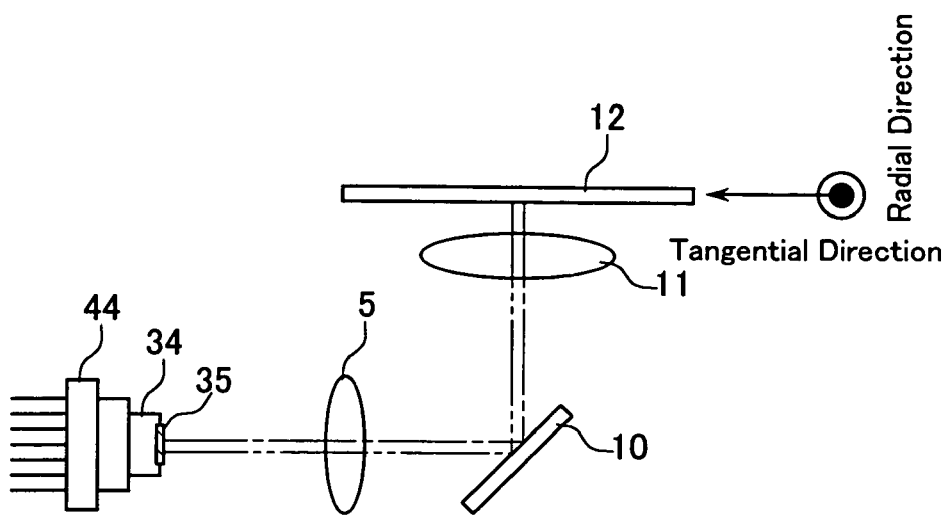
FIG. 16 is a structural view showing another optical head device according to the second embodiment of the present invention.
Figure 17:
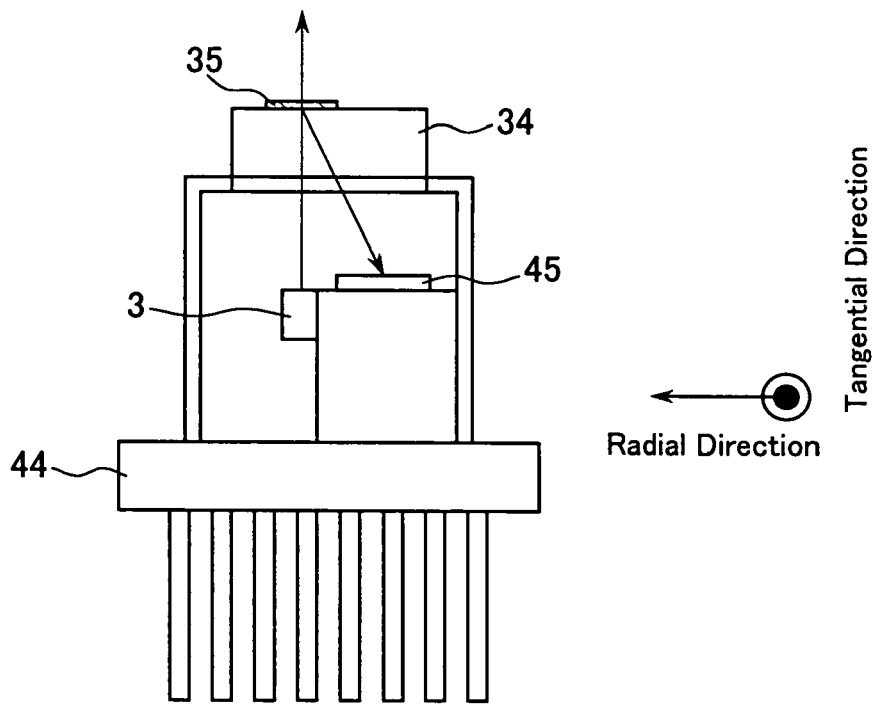
FIG. 17 is a plan view showing another optical module according to the second embodiment of the present invention.

In addition, another configuration to which a semiconductor laser element with a conventional can package is applied as shown in FIGS. 16 and 17 also can be employed as the configuration of the optical module. In this configuration, a light-receiving substrate 45 is disposed inside in a can package 44 on which a holographic optical element 34 is placed, and thereby, optical components other than a collimator lens 5, a mirror 10 for reflecting light upward, and an objective lens 11 are integrated as one unit.

Figure 18A:
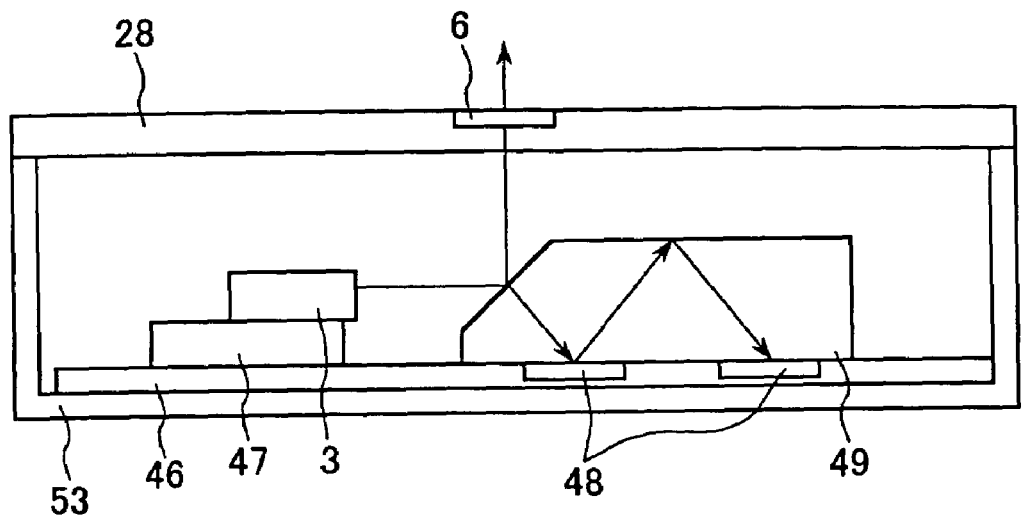
FIGS. 18A and 18B are a cross-sectional view and a plan view, respectively, showing yet another optical module according to the second embodiment of the present invention.
Figure 18B:
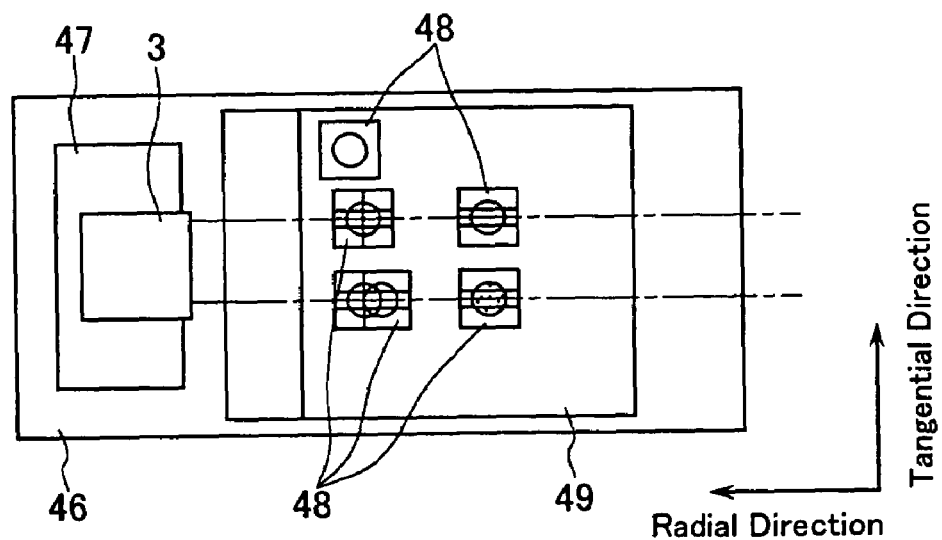

Furthermore, still another configuration as shown in FIGS. 18A and 18B also can be employed as the configuration of the optical module. In this configuration, light-receiving regions 48 and a heat sink 47 are disposed on a light-receiving substrate 46, and a dual-wavelength monolithic laser 3 is soldered on the heat sink 47. For the purposes of reflecting a light beam emitted from the dual-wavelength monolithic laser 3 and of leading returning light from an optical disk to the light-receiving regions 48, a prism 49 is disposed on the light-receiving substrate 46. The light-receiving substrate 46 is disposed inside a package 53 that is sealed with a cap 28 having a diffraction grating 6 formed for 3-beam formation.

An optical head device including the optical module as mentioned above also can be reduced in size and weight.

Furthermore, all of the application examples mentioned in the first embodiment also can be applied to this embodiment.

Third Embodiment

Figure 19:
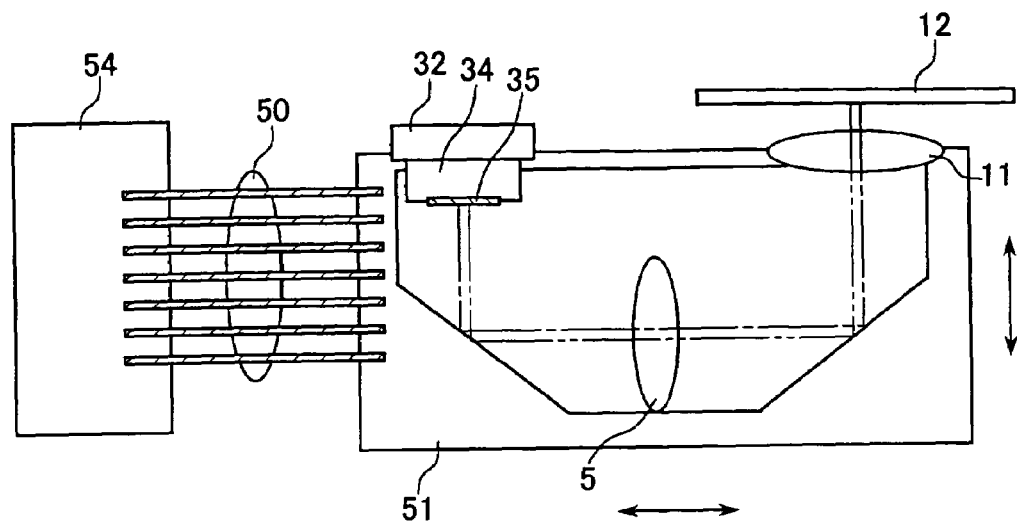
FIG. 19 is a structural view showing an optical head device according to a third embodiment of the present invention.
Figure 20:
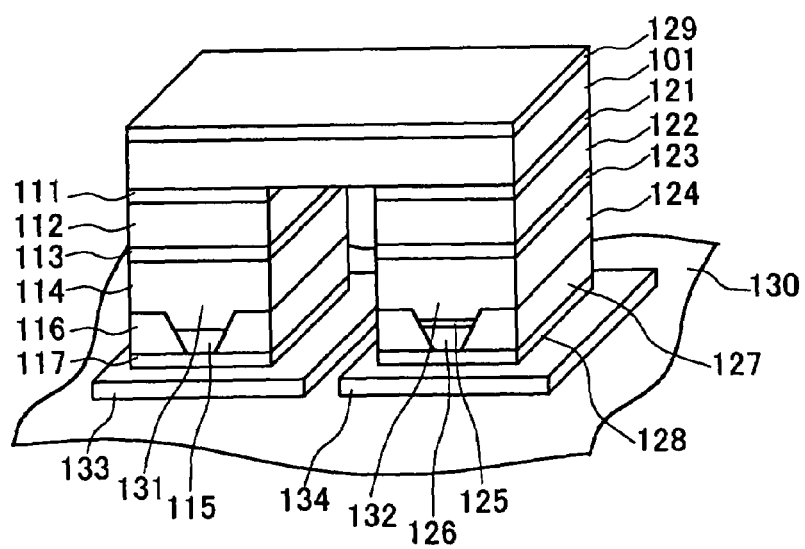
FIG. 20 is a perspective view showing a conventional integrated semiconductor laser device.
Figure 21:
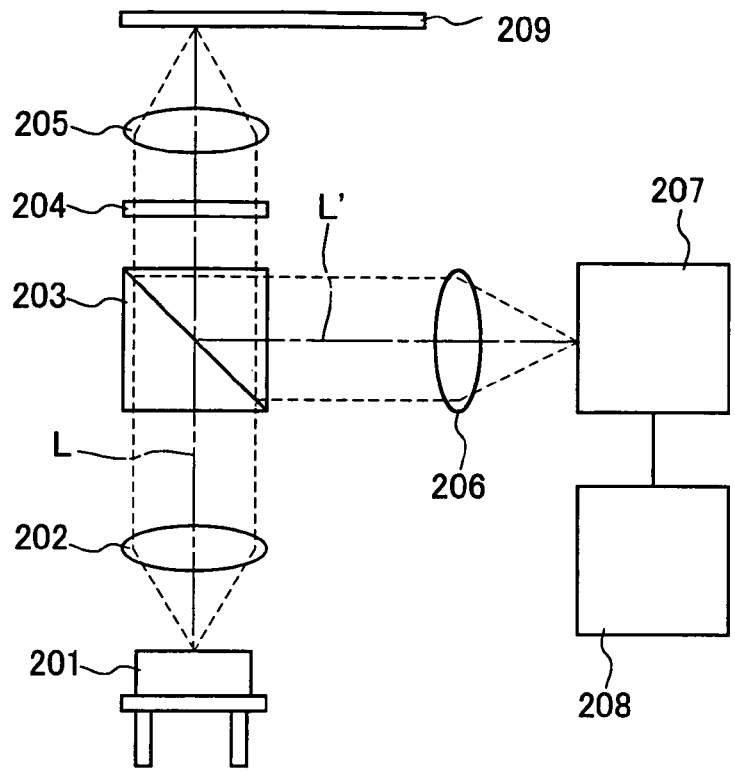
FIG. 21 is a structural view showing a conventional optical head device.
Figure 22:
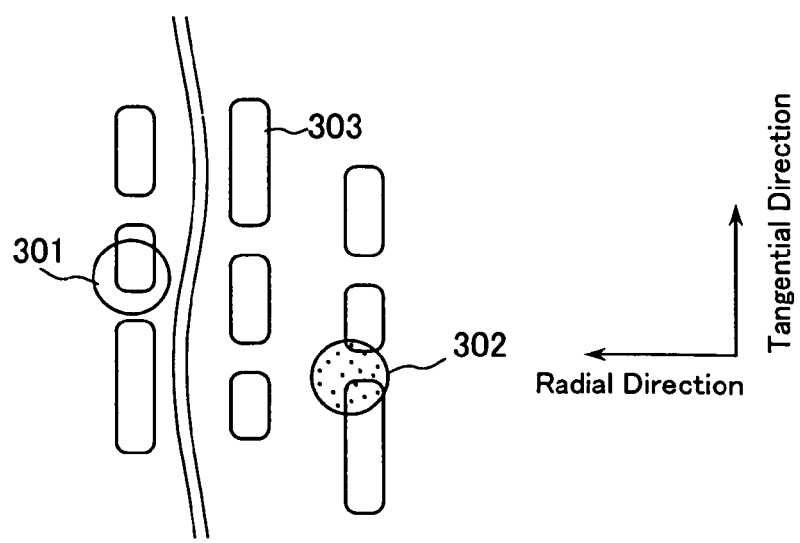
FIG. 22 is a diagram showing a state of beam spots on an optical disk according to a conventional technique.
Figure 23:
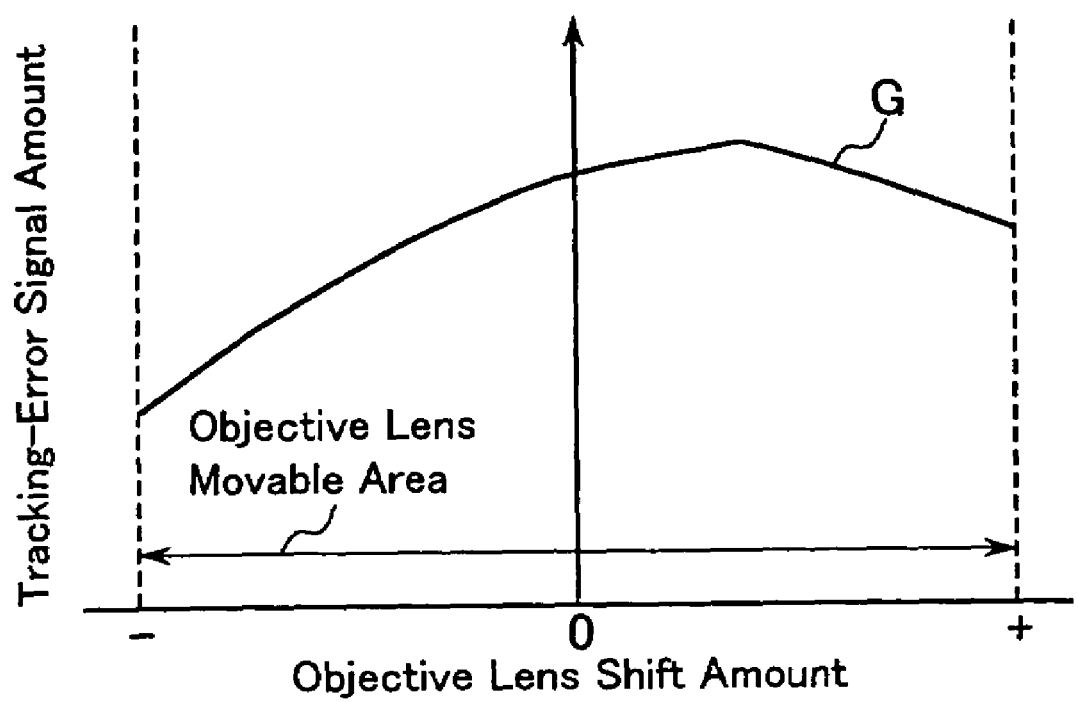
FIG. 23 is a graph for showing the dependence of a tracking-error signal amount on a shift of an objective lens in the conventional optical head device.

An optical head device and an optical recording and reproducing apparatus according to a third embodiment of the present invention will be described with reference to FIG. 19 in the following. FIG. 19 is a structural view showing an optical head device according to the third embodiment of the present invention.

The optical head device of this embodiment basically has the same configuration as that of the first embodiment, but as shown in FIG. 19, its entire optical system is integrated as one unit. That is, an optical module 32, a collimator lens 5, and an objective lens 11 are included in a package 51 that is connected to a supporter 54 via wires 50 functioning as both supporting wires and signal wires. The package 51 also functions as a reflector for reflecting a light beam emitted from the optical module 32 and bending its optical path. In this configuration, a servo signal detected in the optical module 32 is output via the wires 50. Based upon the servo signal, the package 51 is moved slightly, through a magnetic circuit (not shown in the figure) as a driving means, to follow the rotation of an optical disk 12 being subjected to recording or reproduction, and thereby, a beam spot can be formed in a pit-row direction or a guide groove direction in the optical disk 12.

The above-mentioned configuration allows the positional relationship between the objective lens and beam emission points to be maintained constantly unlike the conventional optical head device in which only an objective lens itself moves slightly. Consequently, the optical head device and the optical recording and reproducing apparatus can be realized that show no degradation in objective-lens shifting characteristic.

Incidentally, the description in this embodiment was directed to an example of the configuration with the optical module 32. However, the optical head device may be assembled using separate optical components as mentioned above in the first embodiment.

Furthermore, all of the application examples mentioned in the first and second embodiments also can be applied to the present embodiment.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head device that is configured to carry out reproduction or recording with respect to a plurality of optical information recording media of various types of pit rows or guide grooves, comprising:
   a plurality of semiconductor lasers that are disposed on one substrate and that are provided so as to correspond respectively to the plurality of optical information recording media of various types of pit rows or guide grooves;
   optical elements disposed on an optical path between the plurality of semiconductor lasers and an optical information recording medium; and
   a plurality of photodetectors where returning light from the optical information recording medium enters,
   wherein the plurality of semiconductor lasers are disposed so that beam spots, formed on the optical information recording medium, of light beams emitted from the plurality of semiconductor lasers are aligned in a substantially same direction as a pit-row direction or a guide groove direction, wherein the pit-row direction and the guide groove direction are both aligned along a tangential direction in the optical information recording medium,
   wherein the optical elements and the plurality of photodetectors are disposed so that part of returning light from the optical information recording medium, which originates in each of the light beams emitted from the plurality of semiconductor lasers, enters one of the plurality of photodetectors at a time, and
   wherein each of the plurality of photodetectors includes a light-receiving region divided into two parts in a direction that is substantially parallel to or substantially perpendicular to the pit-row direction or the guide groove direction in the optical information recording medium, part of returning light from the optical information recording medium being detected therein irrespective of which of the plurality of semiconductor lasers emits light beams.

2. The optical head device according to claim 1, wherein the plurality of semiconductor lasers have different emission wavelengths from one another.

3. The optical head device according to claim 2, wherein two semiconductor lasers are provided and have different emission wavelengths, each of which is selected from a group consisting of ranges of: 630 nm to 690 nm, 780 nm to 820 nm, and 200 nm to 450 nm.

4. The optical head device according to claim 2, wherein the plurality of semiconductor lasers and at least part of the plurality of photodetectors are integrated on one substrate.

5. The optical head device according to claim 1, wherein beam emission points of the plurality of semiconductor lasers are aligned on a substantially straight line and are spaced at 150 μm or less.

6. The optical head device according to claim 1, wherein one of the optical elements is a diffraction grating.

7. The optical head device according to claim 6, wherein the diffraction grating is divided into 2n (where n indicates a natural number) diffraction regions with different grating periods from one another.

8. The optical head device according to claim 7, wherein dividing lines that divide the diffraction regions are positioned substantially parallel to or substantially perpendicular to the pit-row direction or the guide groove direction in the optical information recording medium.

9. The optical head device according to claim 7, wherein one of the dividing lines that divide the diffraction regions divides returning light from the optical information recording medium into two substantially equal parts.

10. The optical head device according to claim 6, wherein the diffraction grating is divided into 2n (where n indicates a natural number) diffraction regions with different grating pitch directions from one another.

11. The optical head device according to claim 10, wherein the dividing lines that divide the diffraction regions are positioned substantially parallel to or substantially perpendicular to the pit-row direction or the guide groove direction in the optical information recording medium.

12. The optical head device according to claim 6, wherein the diffraction grating is sawtooth-shaped.

13. The optical head device according to claim 6, wherein the diffraction grating has grooves whose depths vary in a step-wise manner in a constant period.

14. The optical head device according to claim 1, wherein all of the plurality of semiconductor lasers are disposed on a heat sink made of a metal or a semiconductor material.

15. The optical head device according to claim 1, wherein a linear diffraction grating is included as one of the optical elements, and returning light from the optical information recording medium that originates in ±1st-order diffracted light formed by the diffraction grating is detected in the light-receiving region.

16. The optical head device according to claim 1, further comprising a rim-intensity correction means.

17. The optical head device according to claim 1, wherein an objective lens is provided as one of the optical elements and is fixed to a package, and the plurality of semiconductor lasers, the optical elements and the photodetectors are disposed in the package.

18. The optical head device according to claim 17, further comprising a supporter, wherein the package is connected to the supporter movably with respect thereto.

19. An optical recording and reproducing apparatus comprising an optical head device, the optical head device being configured to carry out reproduction or recording with respect to a plurality of optical information recording media of various types of pit rows or guide grooves comprising;
- a plurality of semiconductor lasers with different emission wavelengths from one another that are disposed on one substrate and that are provided so as to correspond respectively to the plurality of optical information recording media of various types of pit rows or guide grooves;
- optical elements disposed on an optical path between the plurality of semiconductor lasers and an optical information recording medium; and
- a plurality of photodetectors where returning light from the optical information recording medium enters,
- wherein the plurality of semiconductor lasers are disposed so that beam spots, formed on the optical information recording medium, of light beams emitted from the plurality of semiconductor lasers are aligned in a substantially same direction as a pit-row direction or a guide groove direction, wherein the pit-row direction or the guide groove direction is aligned along a tangential direction in the optical information recording medium,
- wherein the optical elements and the plurality of photodetectors are disposed so that part of returning light from the optical information recording medium, which originates in each of the light beams emitted from the plurality of semiconductor lasers, enters one of the plurality of photodetectors at a time, and
- wherein each of the plurality of photodetectors includes a light-receiving region divided into two parts in a direction that is substantially parallel to or substantially perpendicular to the pit-row direction or the guide groove direction in the optical information recording medium, part of returning light from the optical information recording medium being detected therein irrespective of which of the plurality of semiconductor lasers emits light beams.

* * * * *